United States Patent [19]
Fujita et al.

[11] Patent Number: 5,621,453
[45] Date of Patent: Apr. 15, 1997

[54] INCREASING IMAGE FORMING METHOD AND APPARATUS THEREFOR IN LED PRINTER

[75] Inventors: Yasunori Fujita; Hirohito Kondo, both of Tokyo, Japan

[73] Assignee: Kyocera Corporation, Kyoto, Japan

[21] Appl. No.: 281,710

[22] Filed: Jul. 26, 1994

[30] Foreign Application Priority Data

Jul. 30, 1993 [JP] Japan .................................. 5-206964
Nov. 30, 1993 [JP] Japan .................................. 5-325960

[51] Int. Cl.$^6$ .............................. B41J 2/47; H04N 1/21; H04N 1/23
[52] U.S. Cl. .............................. 347/240; 358/298
[58] Field of Search .............................. 347/129, 900, 347/131, 240; 395/107; 358/298

[56] References Cited

U.S. PATENT DOCUMENTS 5,455,681  10/1995  Ng .................................. 358/298

*Primary Examiner*—Benjamin R. Fuller
*Assistant Examiner*—Thinh Nguyen
*Attorney, Agent, or Firm*—Loeb & Loeb LLP

[57] ABSTRACT

A LED printer utilizing a low resolution print engine for forming high resolution images is disclosed, in which a virtual 2N dpi high density image (latent image) is formed on a photosensitive medium by effectively turn-on controlling an array of LED elements arranged at a pitch of N dpi on a line in the main scanning direction.

For each scanning line, a plurality of divisional exposure lines are produced for turning on the LED elements 2 m times (for instance 2×4 times) in the auxiliary scanning direction. For the turn-on control of the LED elements, weighted arithmetic operation values are obtained by multiplying the center bit and one or more adjacent bits thereto in the main scanning direction of the 2N dpi high density image data by respectively corresponding constants, and they are summed up to obtain sum data. According to the sum data the number of times of turning on the LED elements on the divisional exposure lines is controlled to form 2N dpi high density image on the photosensitive medium.

6 Claims, 11 Drawing Sheets

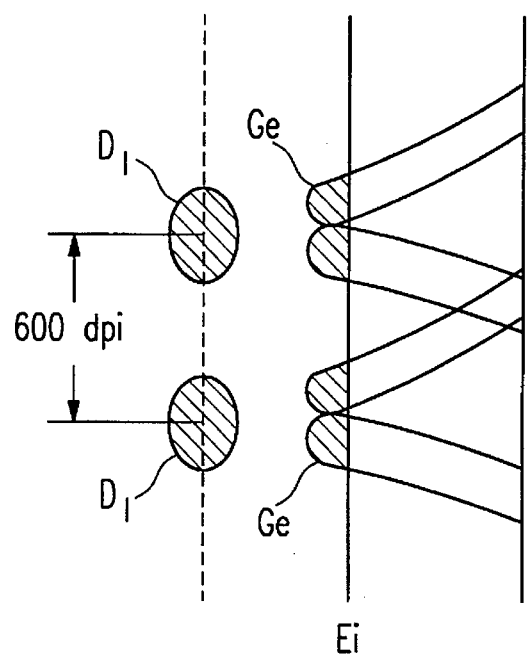
FIG. 1 (A)
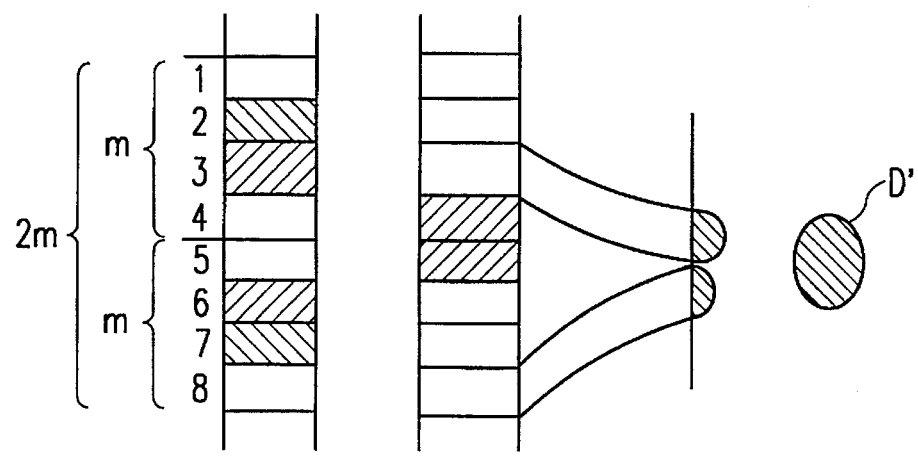
FIG. 1 (A')

INCREASING IMAGE FORMING METHOD AND APPARATUS THEREFOR IN LED PRINTER

BACKGROUND OF THE INVENTION

1. Field of the Invention

This invention relates to LED printers utilizing a low resolution print engine for forming high density images and, more particularly, to an image forming method and an apparatus therefor in a LED printer for forming a virtual 2N dpi high density image on a photosensitive medium by effectively turn-on controlling an array of LED elements arranged at a pitch of N dpi on a line in the main scanning direction.

2. Description of the Prior Art

A LED printer has been well known in the art, which has a LED head having an array of LED elements arranged in a row in the main scanning direction. The LED head faces a photosensitive drum and extends along a bus bar thereof. The LED elements are turn-on controlled for one line at a time or in units of blocks according to video data to form a dot matrix image pattern on the photosensitive drum which is moved relatively in the auxiliary scanning direction.

As this type of LED printer, 300 dpi printers which have low density dot pitch have been used extensively because their price is low and also they are compact in construction. In recent years, however, high density dot pitch printers, for instance 600 dpi printers, have been proposed for higher image quality and resolution.

For constructing a 600 dpi printer, however, the lens structure scale and polygon mirror rotation speed are increased to provide a reduced beam diameter, thus inevitably leading to apparatus size increase. Besides, fine and stringent photosensitive drum rotation speed control is necessary, thus leading to complications of the apparatus construction.

Accordingly, there have been attempts to form virtual high density (i.e., 600 dpi) images by making direct use of existing low density engines (for 300 dpi).

As an example, according to the U.S. Pat. No. 5,134,495, the beam light intensity is set such that, as shown in FIG. 10, the potential level L of the beam dots Dn focused on the photosensitive drum is lower than the effective potential level Ls of effective dots G of latent image, and the potential level of the overlapped portions Dg of the beam dots Dn is higher than the level Ls. A technique has been proposed, which is predicated in the fact that by suitably overlapping the beam dots Dn, an effective dot G is not formed in a central area Dc of dot Dn free from overlap but is formed in the overlapped portions Dg. In this technique, when dots are printed in a row with a 300 dpi engine, effective dots G are formed only in the overlapped portions Dg. An effective dot G is formed on each side of a beam dot Dn. In other words, effective dots G are formed between adjacent actual lines at the pitch of 300 dpi, and 600 dpi image can be formed by effective dots G on 600 dpi lines between adjacent 300 dpi lines.

However, since this prior art technique is based on the overlapping of beam dots, it is necessary to use a somewhat large beam diameter, i.e., a beam diameter greater than that in case of N dpi, for the exposure of the photosensitive drum bus bar. Therefore, combining the effective dots G with usual dots leads to difficult control.

Accordingly, in the above prior art technique the laser beam pulse width is varied to use laser beam pulses having a plurality of different beam intensities for control. However, in the LED printer in which the LED elements are turned on for one scanning line at a time or in units of n bits, unlike the laser beam case it is impossible to obtain fine and dense control in units of a bit.

Further, to provide 600 dpi pitch overlap positions the data for producing pulses have to be 600 dpi data, and this, unlike the conversion of 300 dpi data into 600 dpi data, does not provide for any resolution increase.

Furthermore, in the above prior art technique, of the above 600 dpi image data the data of the center bit and eight adjacent bits thereto, i.e., 3×3 bit data, are successively taken out with a matching template for comparison with said templates with a large number of bits, thus controlling the beam pulse for producing the center bit in said plate. However, comparing matrix data of 3×3 bits, i.e., a total of 9 bits, with templates means that a large number of templates are required for conversion.

Besides, since the comparison is a two-dimensional process in both the main and auxiliary scanning directions, a shift register is necessary for accommodating bit data of three successive main scanning lines adjacent to the center bit. At any rate, the circuit construction is inevitably increased, and also delay of the operation of comparison is inevitable. Therefore, it is impossible to cope with operation speed increase.

SUMMARY OF THE INVENTION

An object of the invention is to provide a method of forming high density image in a LED printer, which can make direct use of an existing print engine of 300 dpi, for instance, for foring high density image of 600 dpi.

Another object of the invention is to provide a method of high density image formation, which permits an easy and accurate density increase process without complicating the circuit construction.

A further object of the invention is to provide a method of high density image formation, which permits high quality image to be obtained, the image being capable of sufficiently withstanding data expansion after density increase process.

The invention is applicable to a LED printer, which permits a 2N dpi high density image to be formed on a photosensitive medium by effectively turn-on controlling an array of LED elements arranged on a line at a pitch of N dpi according to data obtained by processing 2N dpi high density image data. A first feature of the invention resides in that for one scanning line a plurality of divisional exposure lines are produced such that they permit the array of the LED elements to be turned on 2 m times (for instance 2×4 times) in the auxiliary scanning direction, thus permitting the array of the LED elements to be turned on 2 m times for each scanning line.

Thus, as for the density increase in the auxiliary scanning direction, since there are 2 m divisional exposure lines, basically it is possible to readily form a high density image of 600 dpi by causing dot formation for every m lines. According to the invention, particularly the LED elements are turned on a number of times (a<m) in correspondence to the main scanning direction for high density latent image formation at a pitch of 2N dpi in the auxiliary scanning direction.

As shown in an embodiment to be described hereinunder, it is possible to set the intensity of exposure of the LED elements arranged at a pitch of 300 dpi, for instance, such that the potential level produced on photosensitive drum by turning on the LED elements slightly exceeds a latent image formation threshold so that small dots may be formed. By so doing, it is possible to form two dots which are substantially continuous to each other, thus forming a print dot having a predetermined area, by turning on two adjacent LED elements on a divisional exposure line for one line. Also, it is possible to form print dots having normal area by turning on LED elements for at least two divisional exposure areas.

A second feature of the invention resides in that, for the turn-on control of the LED elements, weighted arithmetic operation values as obtained from the data of the center bit and one or more adjcent bits thereto in the main scanning direction of the 2N dpi high density image data by multiplying these data by respectively corresponding constants and that a 2N dpi high density image is formed on a photosensitive drum by controlling the number of times of turning on the LED elements on the divisional exposure lines according to sum data obtained by summing the individual arithmetic operation values.

In this case, the total sum of the constants by which to multiply the data of the center bit and adjacent bit thereto is suitably m corresponding to ½ line of the divisional exposure line.

A suitable apparatus for realizing such density increase comprises a window register for sampling a (a<m) sample bits by shifting the center bit and one or more adjacent bits thereto in the main scanning direction of the 2N dpi high density image data by two bits each in the main scanning direction, a constant storage unit with a constants for weighting stored therein, means for producing arithmetic operation values by multiplying or ANDing the individual sample bit data and the respectively corresponding constants, and summing means for producing sum data by summing the arithmetic operation values.

According to the invention, suitably the intensity of exposure of the LED elements is set such that the potential level produced on photosensitive drum by turning on the LED elements slightly exceeds a latent image formation level so that small dots may be formed and also that print dots having normal area may be formed by turning on the LED elements for at least two divisional exposure lines.

As described before, the total sum of the a constants stored in the constant storage unit is m corresponding to ½ line of the divisional exposure line.

The principles underlying and functions of the invention will now be described.

A LED head array which is assembled in a LED printer has a structure that light image output from a LED element is focused by a focusing lens (such as a "Cellfox" lens) on a photosensitive medium. Thus, the energy distribution on the photosensitive medium at the time of the exposure is substantially normal distribution with respect to the light intensity.

For example, on the image processing side of the LED printer, the rate of data transfer to the print engine is set to 8 times that in the case of 300 dpi, and correspondingly the number of the divisional exposure lines is set to 8 (2 m). Thus, the light intensity (or energy) of the LED elements in each line surpasses a threshold level Ei and permits formation of small diameter print dots in one divisional exposure line.

Consequently, as shown in FIG. 1(A), in the auxiliary scanning direction for every m lines, the LED elements are turned on (m–a) times, ⅔ time, such as the second and third or sixth and seventh divisional exposure lines. Thus, high density image of print dots $D_1$ at a pitch of 600 dpi in the auxiliary scanning direction and having a predetermined diameter can be formed. To form dots at 300 dpi, the LED elements are turned on successively for 4 lines such as the third to the sixth lines, i.e., ⅘ time.

Further, as shown in FIG. 1(A'), it is possible to shift dot $D_1'$ toward an adjacent auxiliry scanning line by turning on the LED elements for 2 lines intervened by the boundary between the fourth and fifth divisional exposure lines. In other words, it is possible to obtain commonly termed smoothing.

With respect to the main scanning line, the LED head array has fixed light emission positions, and the actual light emission positions are on actual lines as shown in FIG. 1(B).

Thus, dots are formed at a pitch of 300 dpi in the main scanning direction.

Since video data are 600 dpi data, for forming 600 dpi dots it is necessary to obtain light emission from the LED elements at the intrinsic pitch of 600 dpi, that is, it is necessary to cause light emission on imaginary lines between adjacent ones of 300 dpi actual lines.

According to the invention, to provide for virtual 600 dpi, the LED elements which are on actual lines on the opposite, i.e., left and right, sides of an imaginary line (in the main scanning direction), are turned on once or a plurality of times according to sum data n which is obtained by summing weighted data obtained from 600 dpi video data by weighting the video data according to the arrangement thereof.

More specifically, by controlling the LED elements on actual lines adjacent to a imaginary line at 600 dpi such that the elements are turned on once, two small dots $D_2$ are formed adjacent to each other on actual line, as shown in FIG. 1(B).

When the two adjacent dots $D_2$ which are smaller than the usual print dot are visually recognized, it is possible to obtain an effect just like that when a virtual dot $D_2'$ is formed on imaginary line.

In the case of FIG. 1(C), the dot on the left actual line, as viewed in the main scanning direction, has resultant energy Ge obtained by turning on twice the LED elements on divisional exposure lines on actual line corresponding to that at 300 dpi shown in FIG. 1(A). It will be understood that it is thus possible to form a print dot $D_3$ having a predetermined diameter (usual print dot) on the actual line. The dot $D_2$ on the left actual line in FIG. 1(C) represents energy when LED light emission is caused only for one divisional exposure line. In either case, a light intensity in excess of the threshold level Ei is given.

Thus, in this case, the print dot $D_3$ on the left actual line or the two print dots, i.e., the print dot $D_3$ and the small print dot $D_2$, when visually recognized, provides or provide an effect just like that when the virtual dot $D_2'$ is formed on an imaginary line.

As for the way of control of the number of times of turning on corresponding divisional exposure line LED elements in relation to adjacent dots, in a preferred embodiment of the invention, it is made according to the pattern arrangement of 600 dpi video data and weighted data obtained from the video data through weighting thereof as determined by a 1×3 window, 3-bit window register.

Further, through control the positions of LED elements to be turned on the divisional exposure lines of each actual line and the number of times of turning-on, it is possible to obtain an effect just like that when given dots are formed on 600 dpi imaginary line.

FIG. 2 will now be referred to for further description.

Where there are continuous blank (or "0") bits as shown in (E), the turning-on with respect to the divisional exposure line is unnecessary.

However, where there are continuous, i.e., three continuous, 600 dpi data bits (or effective dots of "1"), including a center bit and left and right adjacent bits as shown in (A), or where dot bit or bits (effective dot or dots of "1") and blank (or "0") bit or bits coexist as shown in (B) to (D), it is considerably difficult to control the number of turning-on times with respect to the divisional exposure line.

According to the invention, 8 divisional exposure lines are provided as shown by the following formula. Thus, the 600 dpi divisional exposure line is determined through turn-on control of the LED elements on some of the one-half and one-fourth divisional exposure lines.

The weighting is made by providing "2" for the center bits and "1" for the left and right adjacent bits, and a light emission pattern for divisional exposure is determined according to sum data n obtained by arithmetic summing.

$$[\{A \times Lp(1, 0)\} + \{B \times Cp(1, 0)\} + \{C \times Rp(1, 0)\}] \times n \qquad (1)$$

$Lp(1, 0)$: left bit (effective dot: "1", blank: "0")

$Cp(1, 0)$: center bit (effective dot: "1", blank: "0")

$Rp(1, 0)$: right bit (effective dot: "1", blank: "0")

A: 1, B: 2, C: 1: weighting constants

The light emission pattern positions for the divisional exposure are determined according to the sum data n obtained by arithmetic summing.

Schematic hardware structure that is involved will now be described briefly with reference to FIGS. 3(A) to 3(C).

From, for instance, a 600 dpi bit map as shown in FIG. 3(A), three sample bit data Lp, Cp and Rp are taken out by causing a shift by two bits for each in the main scanning direction with window register 5 of 1×3 windows. In constant storage sections $6A_1$, in which a number of constants for weighting are stored, the individual sample bits Lp, Cp and Rp are multiplied by or ANDed with respective constants to generate arithmetic operation values. In this example, arithmetic operation means $6A_2$ comprise AND gates.

The arithmetic values obtained by the above arithmetic operations are added together in adder means $6A_3$. The sum data n which is thus obtained for the center bit $5A_1$ corresponding to 600 dpi on the actual line 61 is Lp: 0, Cp: 1, Rp: 0. Thus, the light emission pattern for the center bit $5A_1$ for the purpose of n=2 is as shown in FIG. 2(C), which is a pattern for exposure with respect to two divisional exposure lines as shown in (C) for FIG. 2.

The weighted sum data n for the attention bit $5B_1$ on the actual line 62 is Lp: 0, Cp: 0, Rp: 1, and the sum data n for the center bit $5C_1$ on the actual line 62 is Lp: 1, Cp: 0, Rp: 0. In either case, n=1.

Thus, the light emission patterns for the center bits $5B_1$ and $5C_1$ on the lines 62 and 63 are as shown in (D) in FIG. 2.

The sum data n of the center bit $5A_2$ on the actual line 61 is Lp: 1, Cp: 2, Rp: 0. Thus, in this case n=3, and the light emission pattern for this center bit $5A_2$ is as shown in (B) in FIG. 2.

With the sum data for the center bit $5B_2$, n=2. Thus, the light emission pattern is as shown in (C) in FIG. 2. With the sum data for the center bit $5C_2$, n=3, and the light emission pattern is as shown in (B) in FIG. 2.

The center bits $5A_1$ to $5A_2$ correspond to attention bits of 600 dpi in the auxiliary scanning direction, and the actual 300 dpi attention bits are $\{5A_1+5A_2 \ldots \}$.

Thus, according to the invention, as will be made clear from the description of the embodiments given hereinunder, it is not that the number of times of divisional exposure of the attention bit (center bit×2: 2 m) is controlled through comparison of 3×3 matrix pattern templates, but the number of times of turning on LED elements is controlled according to the sum data n obtained by summing arithmetic values obtained by weighting data of the center bit and adjacent bits of 600 dpi input video data. Thus, there is no need of preparing a large number of templates, and also any 3×3 matrix register for storing bit data of three successive main scanning lines adjacent to the center bit. Thus, it is possible to greatly simplify the circuit construction. In addition, the operation is very simple because it is a summing process. Further, no software process is necessary, thus readily permitting processing speed increase, and it is possible to permit processing at a high density to be carried out accurately.

DETAILED DESCRIPTION OF THE PREFERRED EMBODIMENT

Now, a preferred embodiment of the invention will now be described in detail with reference to the drawings. It is to be understood that unless particularly noted the sizes, materials, shapes, relative dispositions, etc. of the components described in connection with the embodiment have no sense of limiting the scope of the invention but are merely exemplary.

Prior to describing the construction of the apparatus according to the invention, main components used in the apparatus will be described.

Figure 1:
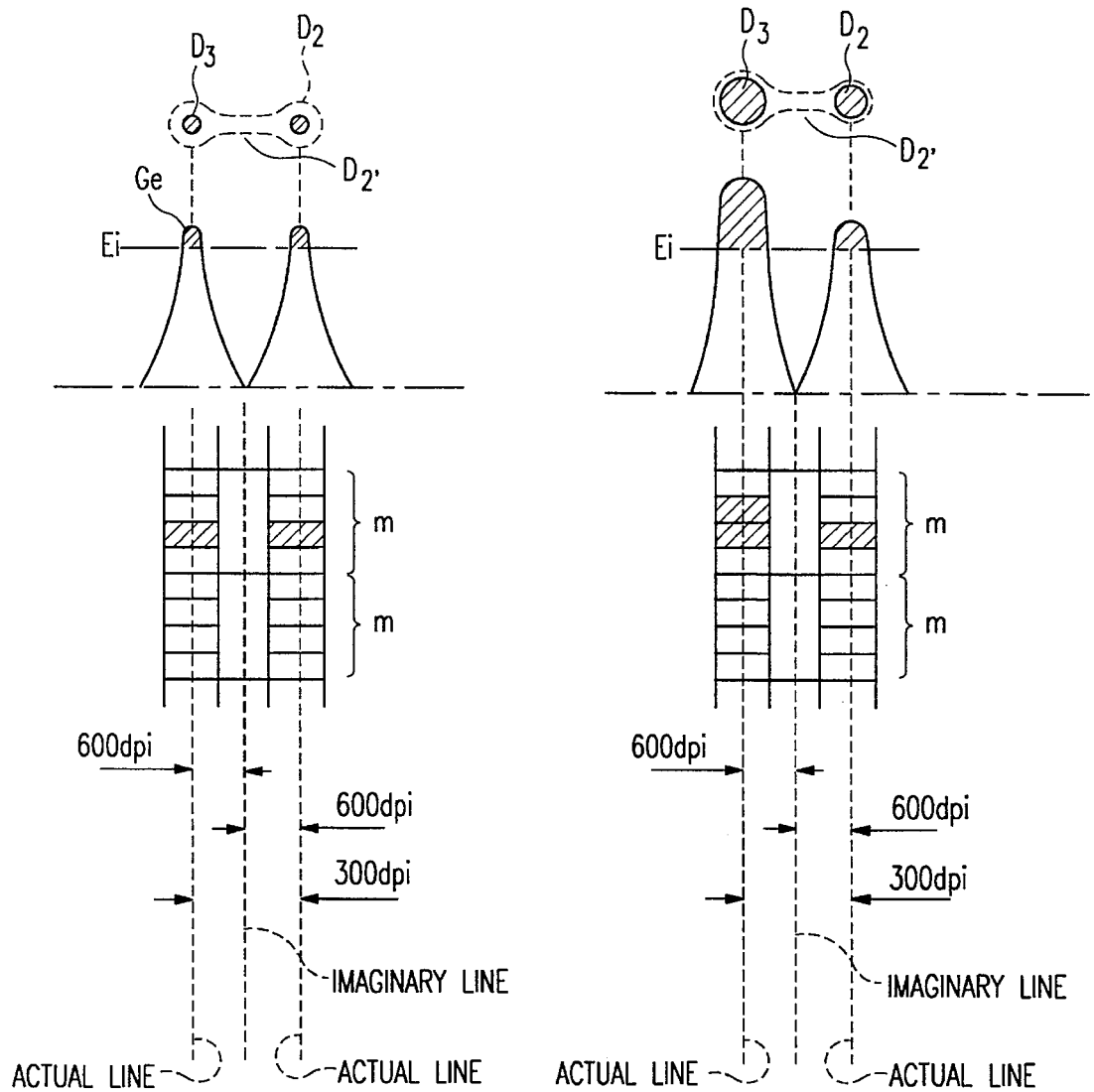
FIGS. 1(A) to 1(C) are views showing LED element light emission energy and latent image formation state, FIGS. 1(A) and 1(A') being taken in an auxiliary scanning direction, FIGS. 1(B) and 1(C) being taken in a main scanning direction.
Figure 2:
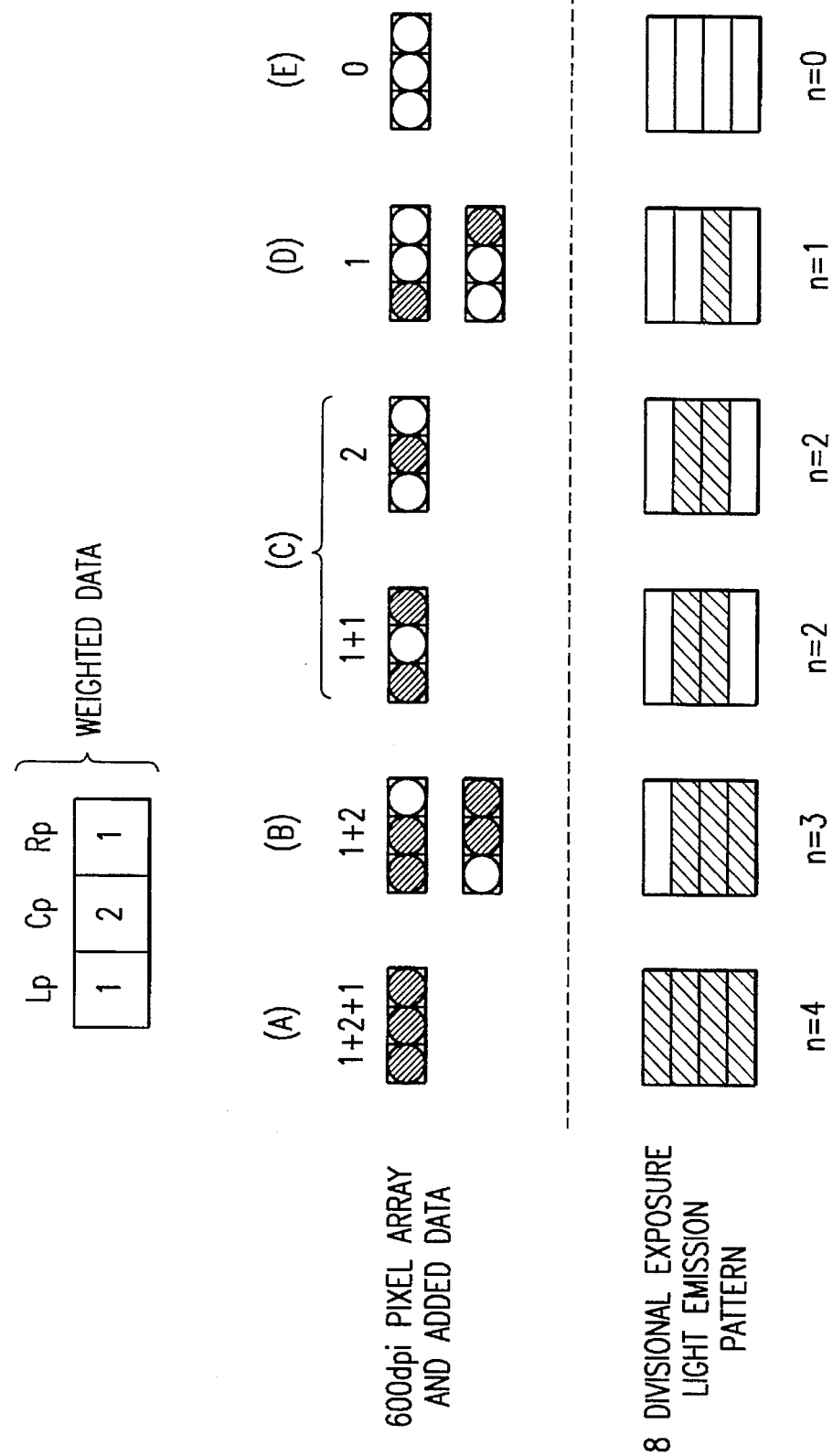
FIG. 2 is a view illustrating the relation between a 3-bit window register and the number of times of turning on LED elements according to the invention.
Figure 3:
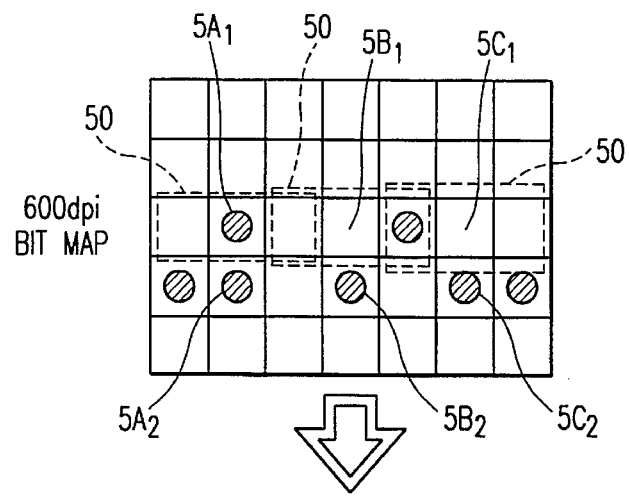
FIG. 3(A) is a view showing 600 dpi bit map data according to the invention.
FIG. 3(B) is a block diagram showing an operational circuit.
FIG. 3(C) is a view showing an example of the number of times of turning LED elements as obtained by the operational circuit.
Figure 3:
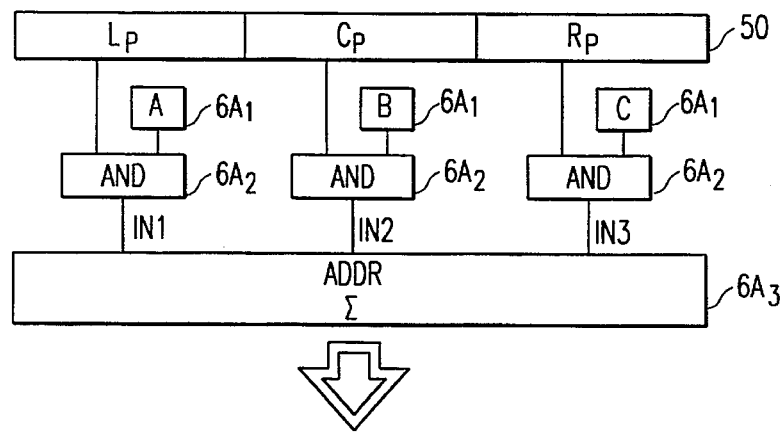
Figure 3:
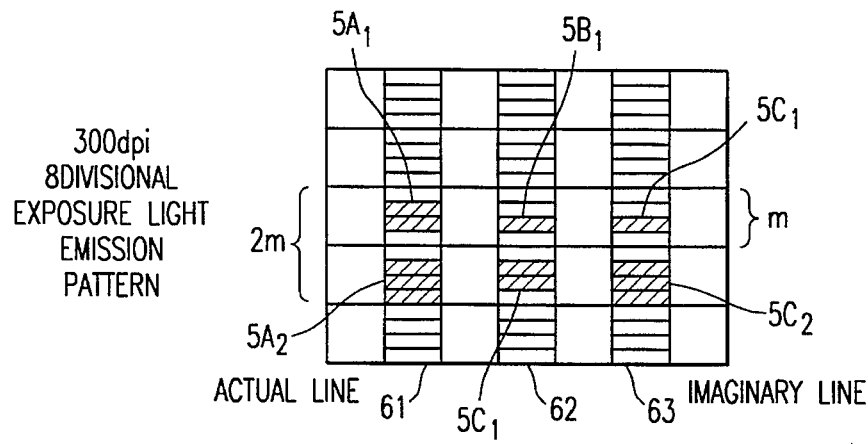
Figure 4:
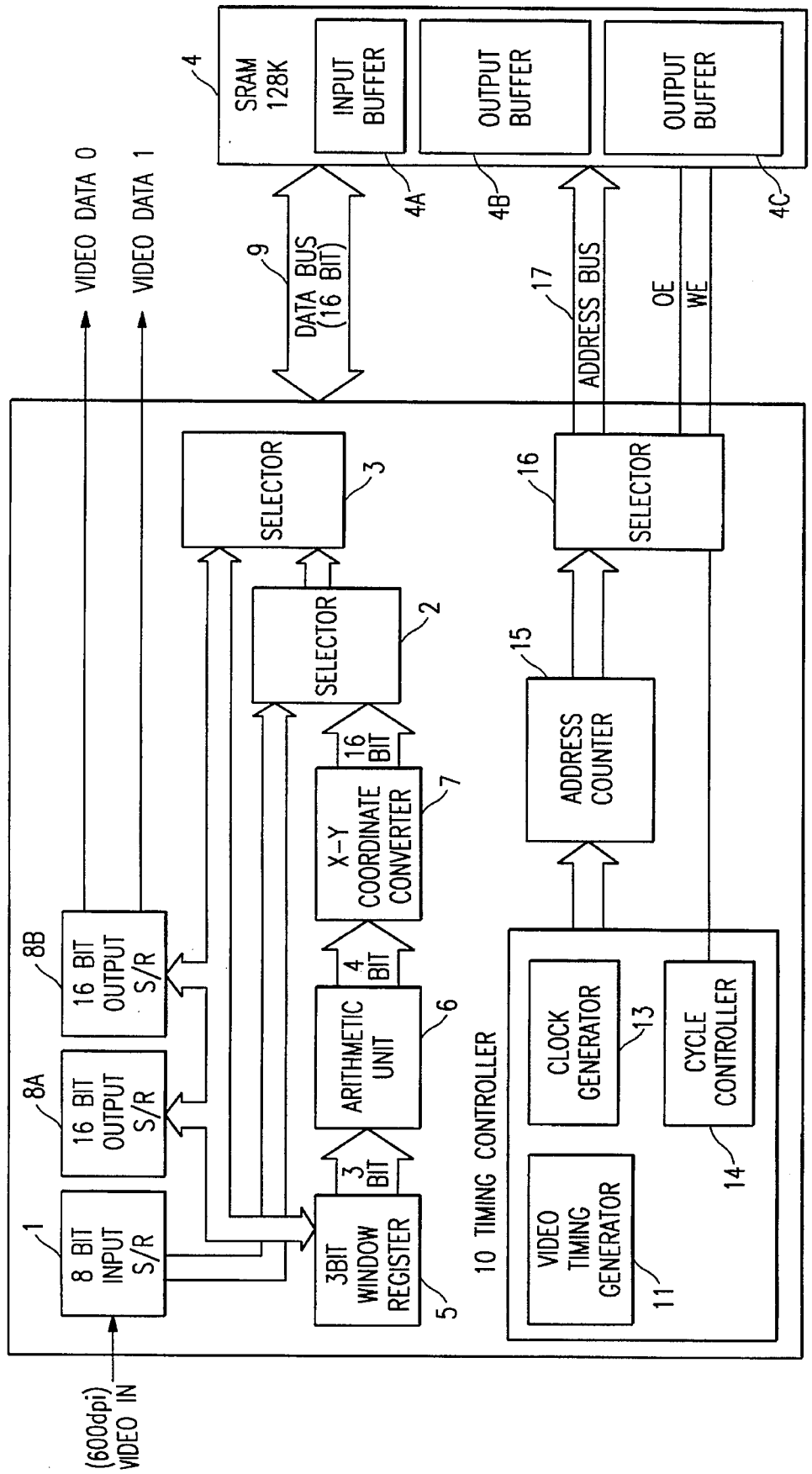
FIG. 4 is a block diagram showing a controller in an embodiment of the invention.

FIG. 4 shows a controller in a LED printer embodying the invention and this structure will now be described in detail with reference to the flow charts of FIGS. 5 to 8.

Figure 5:
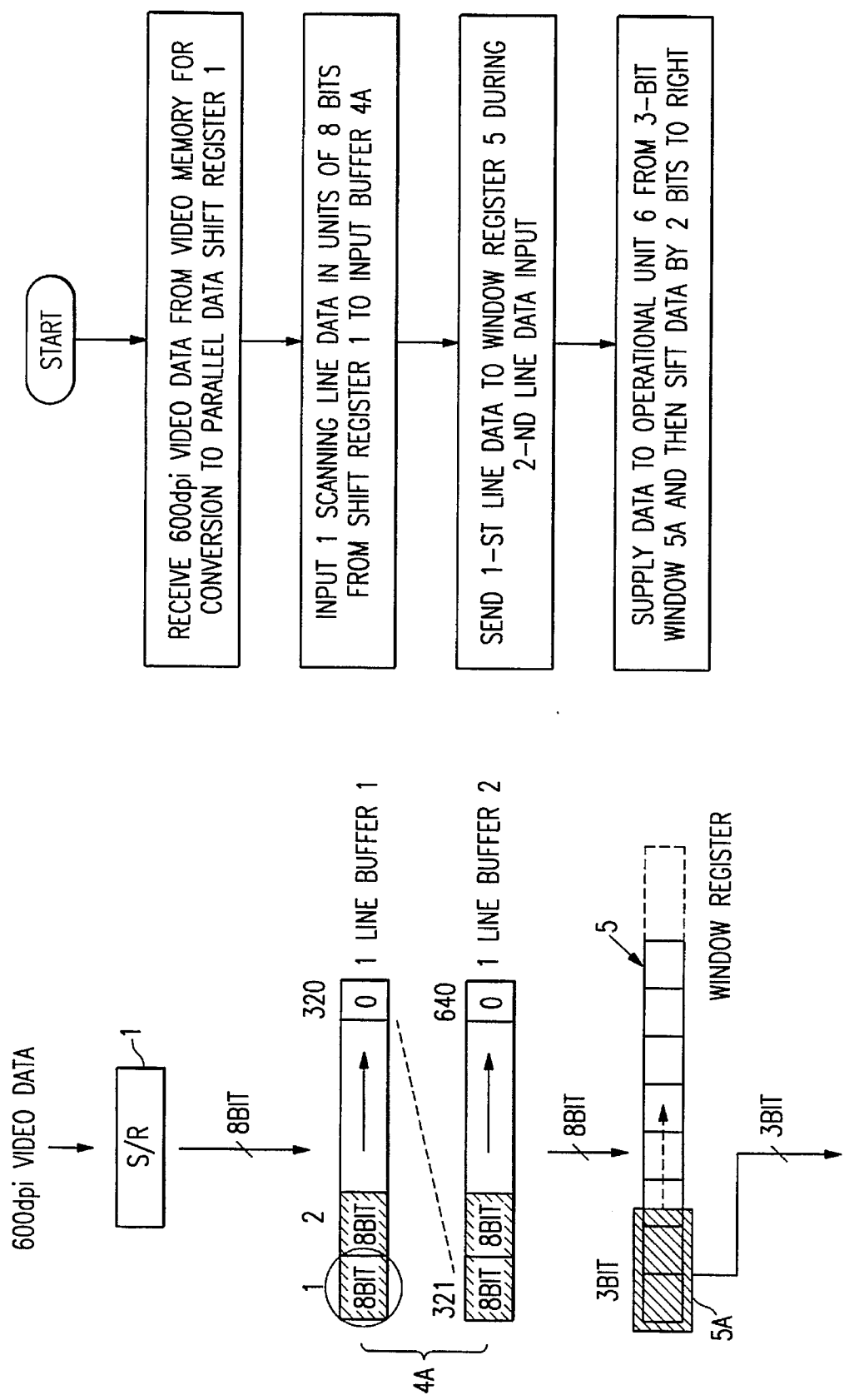
FIG. 5 is explanatory view 1 showing the flow of data shown in FIG. 4 and corresponding functions.

As shown in FIGS. 4 and 5, for instance, when video data of 600 dpi are transmitted serially from a main controller (not shown) to an 8-bit input register 1, the register 1 writes the data in units of 16 bits, that is, whenever 16-bit data is stored in it, as parallel data through selectors 2 and 3 and a 16-bit data bus 9 in an input buffer 4A in a SRAM 4.

The SRAM 4 includes the input buffer 4A (5,120 bits×2 lines) which can receive input data of 600 dpi for two main scanning lines, and output buffers 4B and 4C which can store main scanning line data (2,560 bits×8 lines) corresponding to 300 dpi×8 divisional exposure lines. The buffers 4B and 4C can be utilized as output buffers and also as processing buffers. After data in one of these buffers has been output, the buffers are switched, and the data on the processing buffer side is then output.

After 600 dpi bit map data for one line, necessary for processing to be described later, has been stored in the input buffer 4A, during the input of 600 dpi bit map data for the 2-nd line the bit map data for the 1-st line is transferred in units of 16 bits form the input buffer 4A to the window register 5. The window register 5 transfers 3-bit data with 3-bit window 50 to an arithmetic unit 6. Subsequently, the window 50 is shifted to the right in units of 2 bits so as to be in correspondence to the actual scanning lines of 300 dpi.

Figure 6:
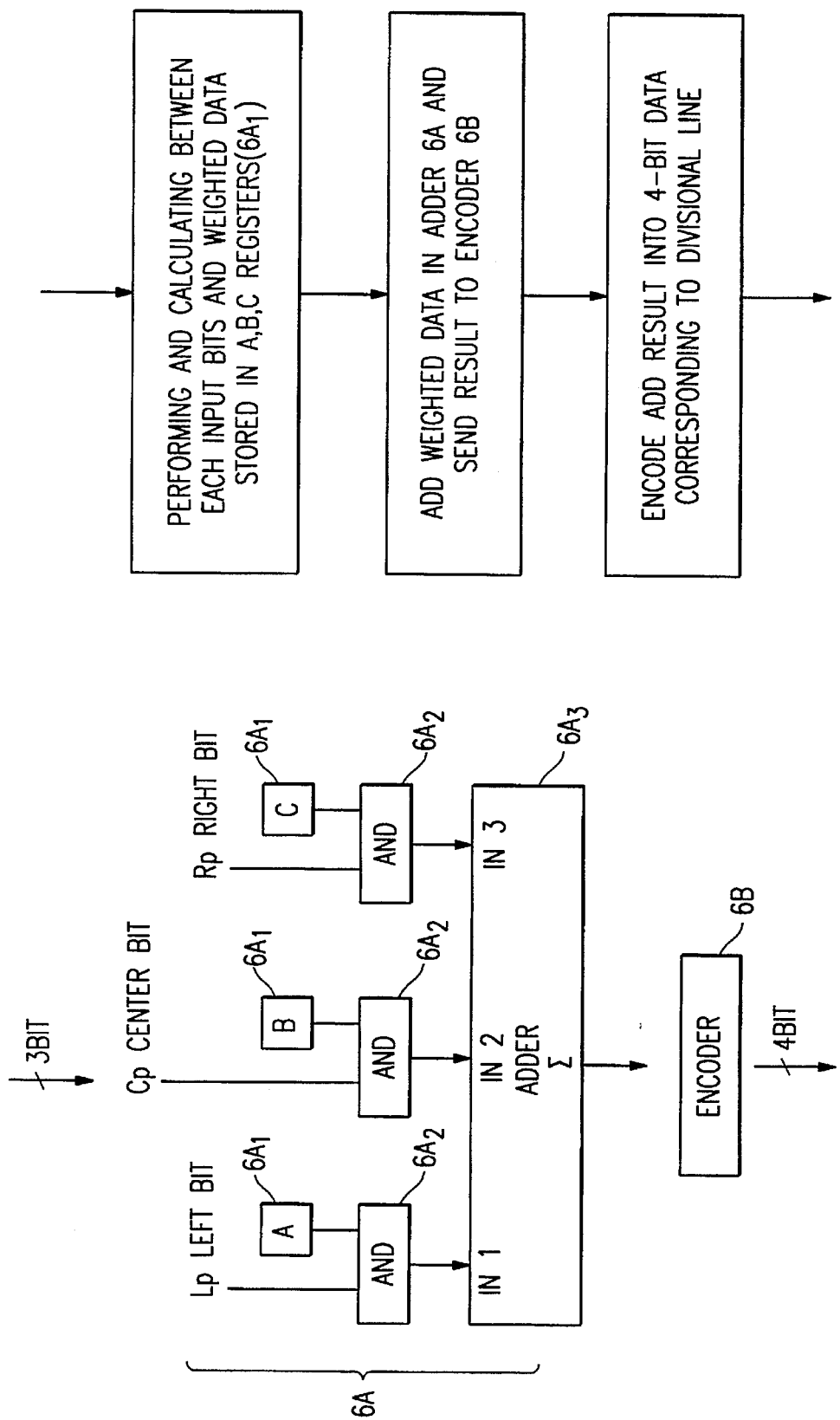
FIG. 6 is explanatory view 2 showing the flow of data shown in FIG. 4 and corresponding functions.

The arithmetic unit 6, as shown in FIG. 6, includes an adder 6A and an encoder 6B and performs arithmetic operations on the basis of the formula (1). As shown in FIG. 6, the adder 6A has constant storage sections $6A_1$, AND gates $6A_2$ and an adder $6A_3$. From the received 3-bit data, weighted arithmetic operation values are obtained. More specifically, the AND gates $6A_2$ each take AND of the bit state ("1" or "0" (effective dot: "1", blank: "0")) of each bit and each corresponding one of the constants (integral numbers) A to C (i.e., "1", "2" and "1") in the constant storage sections $6A_1$, and the adder $6A_3$ adds together these weighted arithmetic operation values to obtain sum data which is supplied to the encoder 6B.

Figure 9:
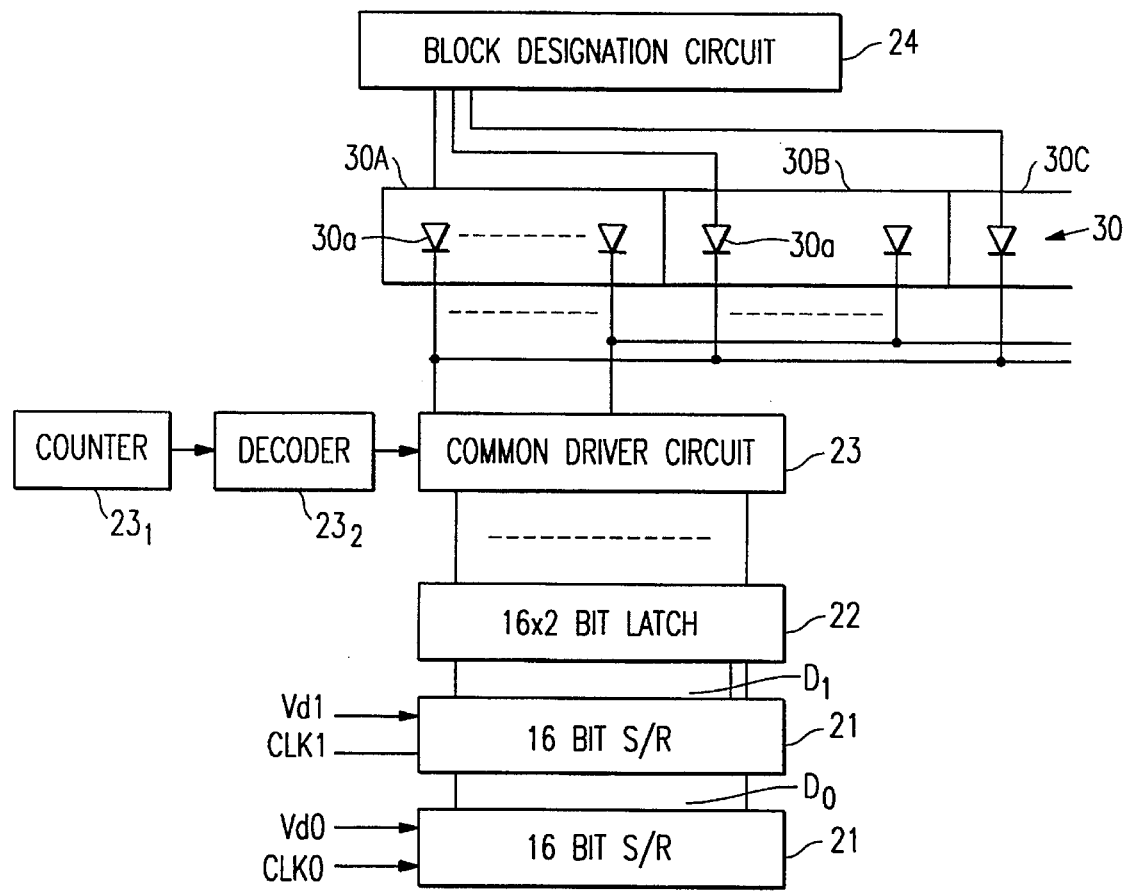
FIGS. 9(A) and 9(B) are views concerning a LED head circuit used in the embodiment.
Figure 9:
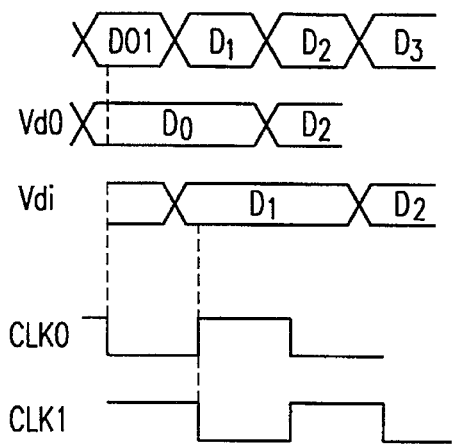
Figure 10:
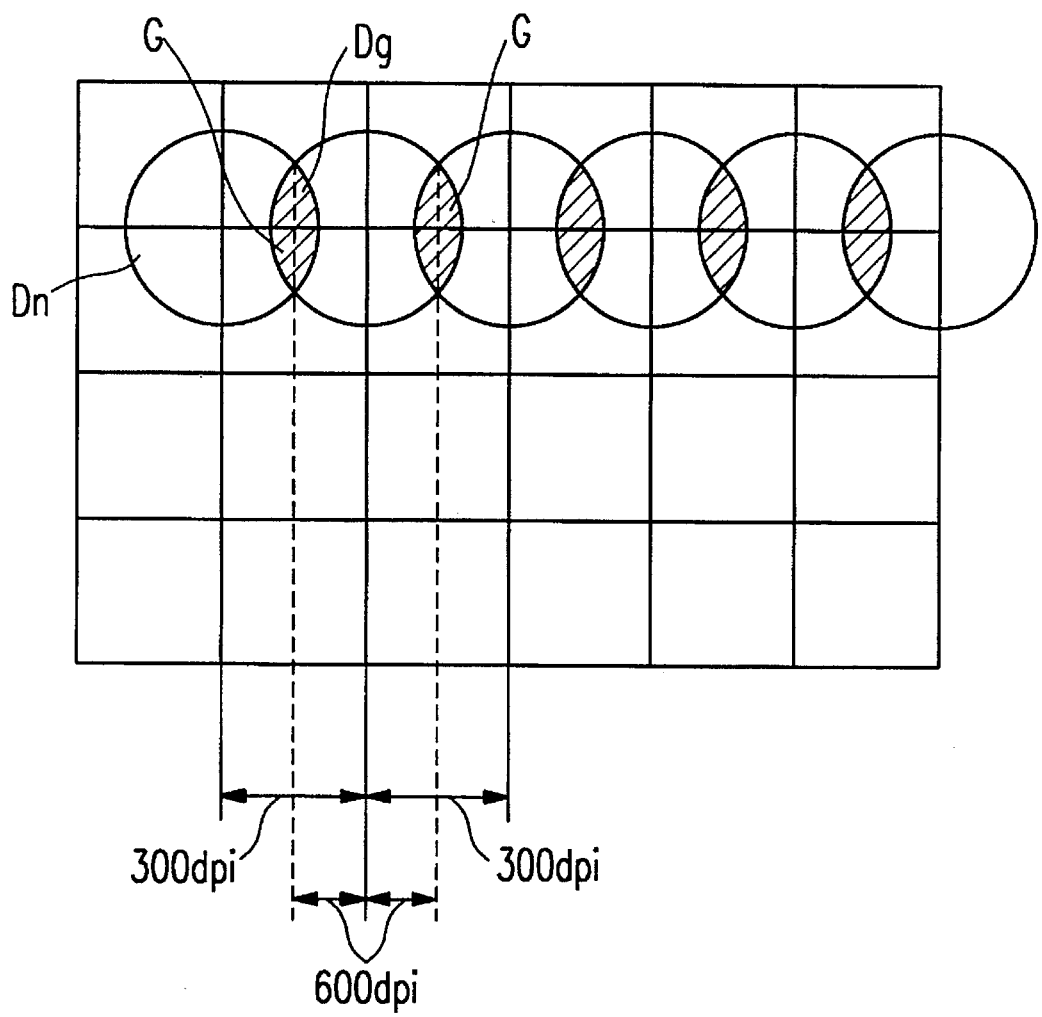
FIG. 10 is a view showing light emission energy and latent image formation state in the prior art.

The encoder 6B performs conversion of the input data into 4-bit data in correspondence to the number of the divisional exposure lines of the LED head 30 (see FIG. 9) to obtain 8-bit data, which determines the turn-on time and number of times of turning-on with respect to four divisional exposure lines m for the center bit corresponding to 600 dpi. The 8-bit data is stored in a coordinate converter (X-Y converter) 7.

To let the window 50 correspond to 300 dpi, three bits, i.e., the 600 dpi center bit and pair adjacent bits thereto in the main scanning direction, as sampled by causing shift in units of 2 bits in the main scanning direction.

Figure 7:
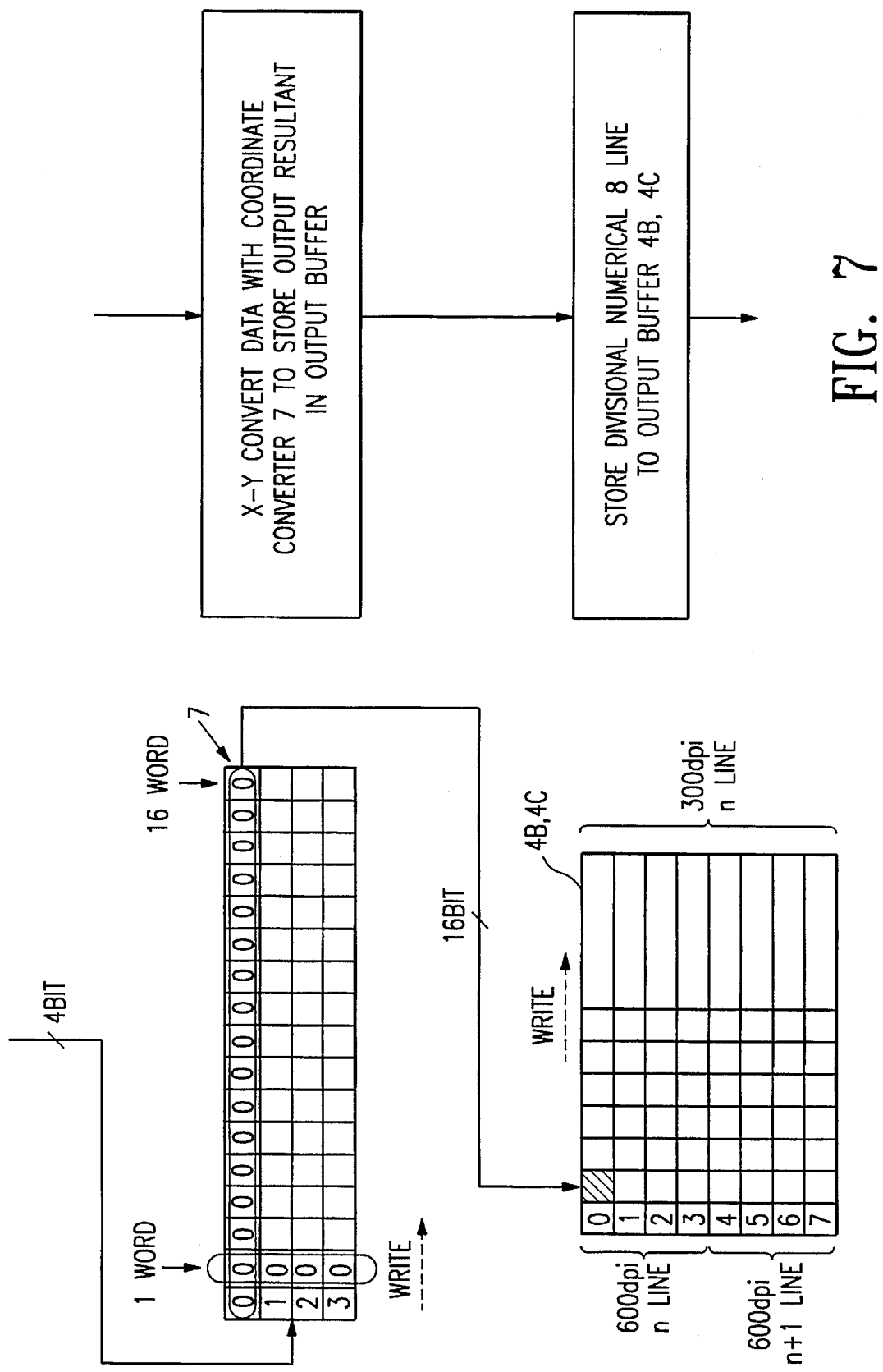
FIG. 7 is explanatory view 3 showing the flow of data shown in FIG. 4 and corresponding functions.

In the coordinate converter 7, as shown in FIG. 7, the data are re-arranged (i.e., coordinate converted) in units of 4 bits in the auxiliary scanning direction. In this way, 16-word (16×4 bits) data is stored and then transferred through the 16-bit data bus 9 to the output buffer 4C in the SRAM 4.

The sequence of operations as described above is repeatedly performed whenever 600 dpi 8-bit data is stored in the input shift register 1. Subsequent to storing 600 dpi data for n main scanning lines in the output buffer 4C, (n+1) main scanning line data of 600 dpi through the input buffer 4A in the SRAM 4 are read out and stored in the output buffer 4C, that is, 300 dpi data for one scanning line by m divisional exposure lines (2,560×8 lines) are stored in the output buffer 4C.

Subsequently, the above operation is repeatedly executed by switching the write/read cycle of the output buffers 4B and 4C.

In other words, the processed data of 300 dpi for 8 divisional exposure lines that are obtained by processing 600 dpi data input to the input buffer 4A, are stored in the output buffers 4B and 4C alternately by switching the write/read cycle for each scanning line.

Figure 8:
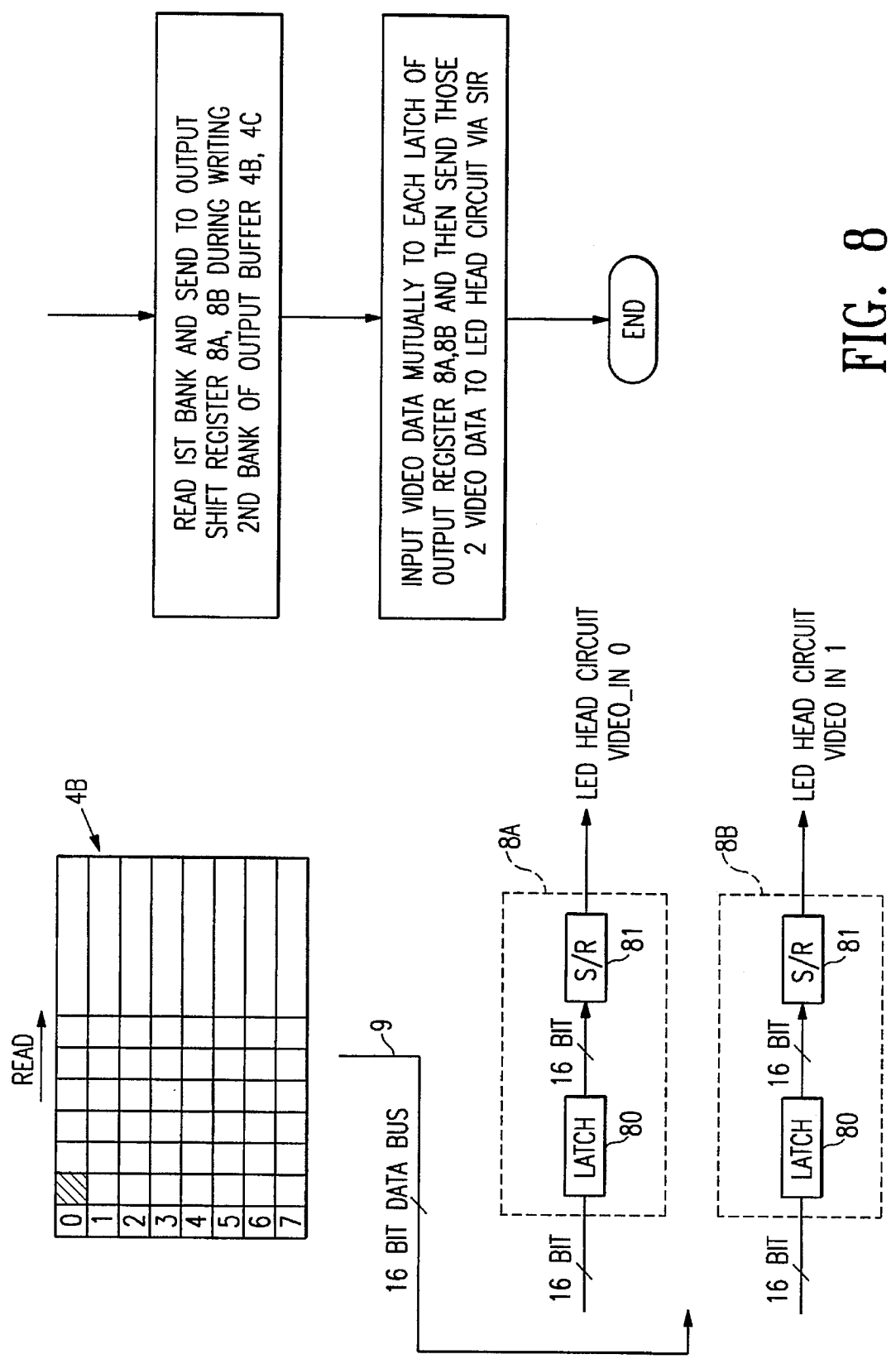
FIG. 8 is explanatory view 4 showing the flow of data shown in FIG. 4 and corresponding functions.

During the above processing, as shown in FIG. 8, of the preceding main scanning line data stored in the output buffer 4B in the cycle noted above the corresponding data are successively transferred in units of 16 bits through the 16-bit data bus 9 to the 16-bit output shift registers 8A and 8B to be transmitted serially to the side of a LED head circuit (not shown) at 8 times the rate of 300 dpi (i.e., 4 times the rate of 600 dpi), that is, at the 2 read cycle rate.

In output shift registers 8A and 8B, the 16-bit data are input alternately to two latches 80 to be transmitted through the shift register 81 to the side of the LED head circuit as shown in FIGS. 9A and 9B.

Thus, in the circuit shown in FIG. 4, the operation of storing the processed data for the divisional exposure to the output buffer 4B or 4C and the operation of transferring the data of each divisional exposure line in units of 16 bits from the output buffer 4C or 4B selectively to the output shift registers 8A and 8B.

In FIG. 4, designated at 10 is a timing controller which includes a video timing generator 11 for generating engine system strobes and various other control signals, a clock generator 13 for generating data transfer clocks, and a cycle controller 14 for setting the buffer switching cycle, etc. These components are controlled according to a horizontal sync. signal Vsync input from the engine side.

Designated at 15 is an address counter for designating write or read address positions in the individual buffers 4A to 4C in the SRAM 4 through a selector 16 and an address bus 17. The buffer switching cycle is switched according to out enable information OE and write enable information WE from a cycle controller 14.

FIG. 9A shows the structure of the LED head circuit. The 16-bit data that have been transferred serially from the controller side output shift registers 8A and 8B as shown in FIG. 4 to the corresponding shift registers 21A and 21B, are latched in a latch 22 of 16×2 bits with a shift of clock timings CLK0 to CLK1 as shown in FIG. 9(B). According to the data latched in the latch 22, a common driver circuit 23 is driven to control the driving of each LED element 30a in the LED chip 30A.

After the data transfer to the latch 22, the next divisional exposure line data in the main scanning direction is continuously stored serially in a shift register 21. Whenever 16-bit data are stored, these data are latched in the latch 22 according to a latch signal, and the connection of the common driver circuit 23 is switched to the next LED chip 30B according to a switching signal from a block designation circuit 24, thus effecting the control of the driving of each LED element 30a of the LED chip 30B. The above sequence of operations is performed repeatedly 80 times to effect data output for one divisional exposure line.

In this way, the control of driving of the LED chips 30A, 30B, . . . is made 80×8 times to turn-on control the LED elements on one scanning line which is divided into 8 lines.

A counter 231 and a decoder 232 control the turn-on time and timing provided by the common driver circuit 23.

The LED chips 30A, 30B, . . . each have, for instance, an array of LED elements of 64 bits arranged in a row. 40 pcs such LED chips 30A, 30B, . . . are arranged in a row to constitute the LED head 30 for A4 size, for instance.

As has been shown in the foregoing, in the embodiment as described above it is not that the number 2 m of times of divisional exposure of the attention pixel is controlled through comparison of a 3×3 dot matrix pattern with templates, but the number of turn-on times is controlled according to the sum data n obtained by merely adding together the weighted arithmetic operation values obtained for the center and adjacent bits of 600 dpi input video data. Thus, for constituting the window 50 it is necessary to provide only m bit registers, m AND gates and at most m constant storage sections. Thus, it is possible to greatly simplify the circuit construction. In addition, a very simple logic circuit suffices for the summing operation. No software processing thus is necessary, thus readily permitting the processing speed increase. It is thus possible to obtain high density processing accurately.

What is claimed is:

1. A method of forming a virtual 2N dpi image according to bit map information of image data having a density of 2N dpi, the method comprising the steps of:

providing an LED printer for producing a plurality of main scanning lines and having a plurality of LED elements arranged at a pitch of N dpi in a main scanning direction for forming an image on a photosensitive medium by controlling on and off operations of the LED elements, generating, for each of the main scanning lines, a plurality of divisional exposure lines for turning on the LED elements 2 m times in an auxiliary scanning direction, weighting data of a center bit and at least one bit adjacent to the center bit in the main scanning direction of the 2N dpi image data to generate arithmetic operation values, the weighting step comprising at least one of the steps of multiplying and ANDing the data of the center bit and the at least one bit adjacent to the center bit with at least one constant value, summing the arithmetic operation values to obtain sum data, and controlling a number of on operations of the LED elements on the divisional exposure lines in response to the sum data, whereby a virtual image having a density of 2N dpi is formed on the photosensitive medium in the main scanning direction.

2. The method of claim 1, wherein the weighting step comprises at least one of the steps of multiplying and ANDing the data of the center bit and the at least one bit adjacent to the center bit with at least a plurality of constants, and wherein a sum of the constants is equal to m and corresponds to ½ line of the divisional exposure line.

3. The method of claim 1, comprising forming an image having a density of 2N dpi on the photosensitive medium in the auxiliary scanning direction by turning on the LED elements x number of times, where x is less than m, for every m divisional exposure lines according to bit map information of the image data having a density of 2N dpi.

4. An apparatus for forming high density images in an LED printer in which divisional exposure lines for turning on a plurality of LED elements arranged at a pitch of N dpi 2 m times in an auxiliary scanning direction are produced in a main scanning direction to permit 2N dpi image to be formed on a photosensitive medium by causing the LED elements to be turned on x number of times for every m divisional exposure lines, where x<m, according to bit map information of image data having a density of 2N dpi, the apparatus comprising:

a window register for sampling x sample bits, where x<m, by shifting a center bit and at least one bit adjacent to the center bit in the main scanning direction of the 2N dpi image data 2 bits each in the main scanning direction, a constant storage unit having a plurality of constants stored therein for weighting, means for generating arithmetic operation values by at least one of multiplying and ANDing the data of each of the sample bits and at least one corresponding constant stored in the constant storage unit, summing means for summing the arithmetic operation values to obtain sum data, and control means for controlling a number of on operations of the LED elements on the divisional exposure lines in response to the sum data, whereby a virtual image having a density of 2N dpi is formed on the photosensitive medium in the main scanning direction.

5. The apparatus of claim 4, wherein the light intensity of exposure of the LED elements is set such that the potential level on the photosensitive medium where the LED elements are turned on exceeds a threshold level of latent image formation, whereby small dots can be formed and whereby print dots having a usual area can be formed by turning on the LED elements for at least two divisional exposure lines.

6. The apparatus of claim 4, wherein the total number of constants stored in the constant storage unit is equal to m and corresponds to ½ of the divisional exposure line.

\* \* \* \* \*